UNITED STATES PATENT OFFICE.

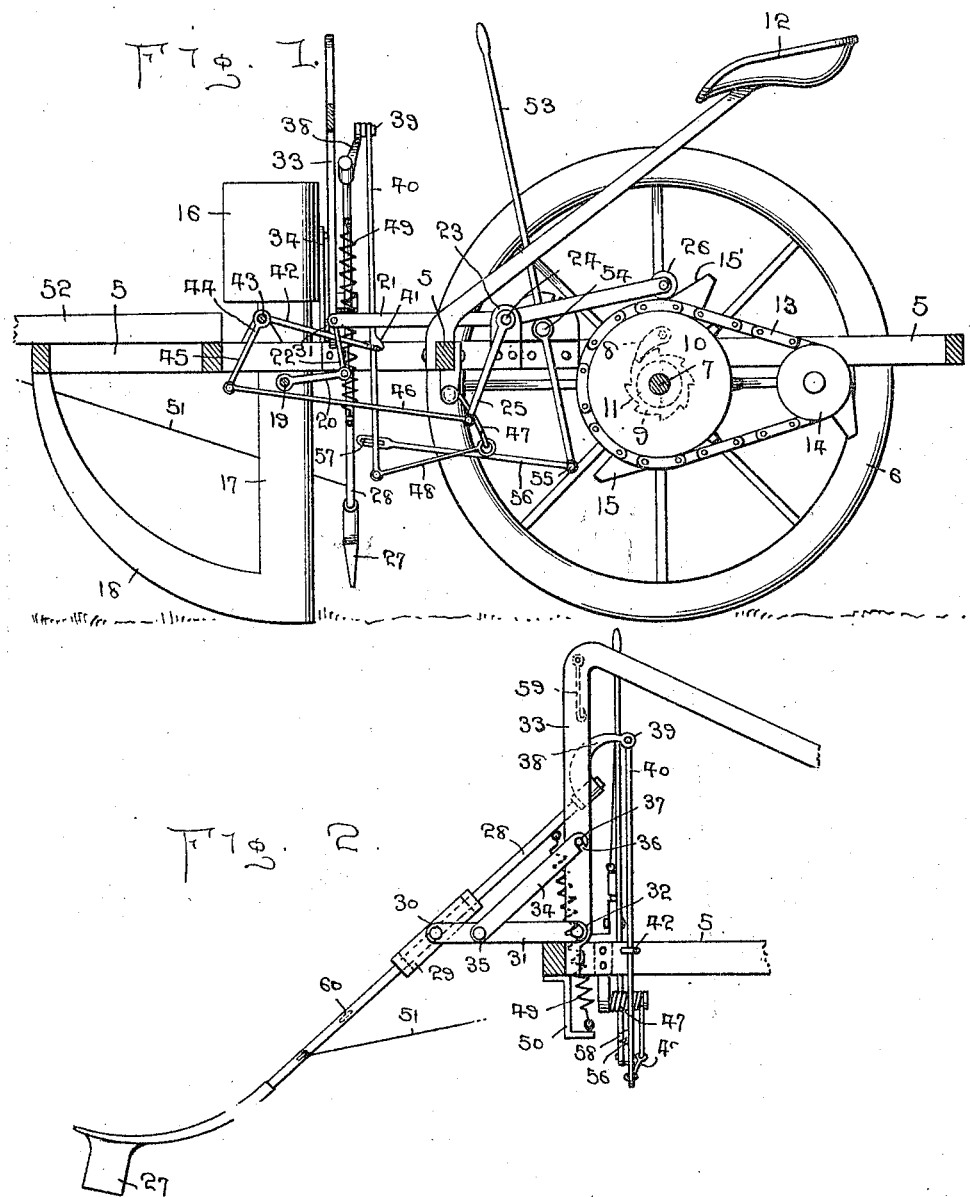

FRANKLIN FERRELL, OF MILLINGTON, MARYLAND.

HILL-MARKER.

1,046,754.  Specification of Letters Patent.   Patented Dec. 10, 1912.

Application filed July 2, 1912. Serial No. 707,203.

*To all whom it may concern:*

Be it known that I, FRANKLIN FERRELL, a citizen of the United States, residing at Millington, in the county of Kent and State of Maryland, have invented certain new and useful Improvements in Hill-Markers; and I do hereby declare the following to be a full, clear, and exact description of the invention, such as will enable others skilled in the art to which it appertains to make and use the same.

This invention relates to corn planters, and it more particularly relates to hill markers for corn planters.

An object of the invention is to provide an improved hill marker which may be attached to corn planters of ordinary construction.

Another object of the invention is to provide an improved hill marker whereby the rows of hills may be made rectilinear and at right angles to each other.

A further object of the invention is to provide an improved corn hill marker whereby the location of the corn hill may be marked directly opposite to a hill of corn which is being dropped, and to mark said location at the instant when said corn is dropped.

A still further object of the invention is to connect my improved hill marker attachment in coöperative relation with the corn-dropping mechanism.

Other objects and advantages may be recited hereinafter and in the claims.

In the accompanying drawings which form a part of this application, Figure 1 is a vertical sectional view of the right hand side of a corn planter having my improved hill marker attached, and Fig. 2 is a fragmental sectional portion of a corn planter, as viewed from the front, having my improved hill marker attached.

Referring to the drawings in which similar reference characters designate corresponding parts throughout the several views, the main frame of the corn planter is represented by the numeral 5, this frame being supported by ground wheels 6 which are rotatable on an axle 7, said axle being rotatably mounted and adapted to be rotated by the wheel 6, through the medium of a pawl 8 and ratchet 9. A sprocket wheel 10 is rotatably mounted on the axle 7, a clutch 11, as indicated in dotted lines, being employed for locking the sprocket 10 and axle 7 together, so that the motion of the sprocket may be established and interrupted at the will of an operator, who occupies the seat 12. The clutch 11 may be of any desired and well known construction, or of any novel and proper construction; and any proper means, (not shown), may be employed for actuating the clutch. Upon the sprocket 10 is a sprocket chain 13 which also runs over an idler 14, and the sprocket chain 13 is provided with cam lugs 15.

A corn planter is provided with the usual corn receptacle or feed chamber 16, corn outlet spout or feed boot 17 and shoe or furrow opener 18, all of ordinary construction. An operating shaft 19 is operatively connected with the feed boot, in the usual manner, and said shaft carries an arm 20, and this arm 20 is pivotally connected with a main operating lever 21, through the medium of a link 22. This lever is mounted in a bearing 23, secured on the frame 5, through the medium of a stub shaft 24 which carries an arm 25, in rigid relation with the operating lever 21. The operating lever 21 carries a roller 26 which is rotated in the line of travel of the lugs 15, so that when said lugs bring their cam surfaces 15' into contact with the roller 26, the latter are raised, thereby raising the rear end of the lever 21 and lowering the front end thereof, so as to actuate the dropper shaft 19, through the medium of the arm 20 and link 22. In order that the locations may be indicated for subsequent droppings of corn, I have provided a hoe which consists of a hoe blade 27, mounted on a hoe beam 28. This hoe beam is secured to a bracket 29 which is pivotally connected at 30 to a supporting arm 31, said supporting arm being pivoted at 32 to a yoke or standard 33, secured on the frame. The movable brace 34 is pivoted at 35 to the supporting arm 31, said brace being provided with a notch 36 which is adapted to engage the pin or stud 37, in the standard 33, for retaining the supporting arm in rigid relation to the standard 33 and frame 5. The end of the hoe beam which is remote from the hoe blade 27, is provided with a connecting arm 38 which is pivotally connected at 39 to a lifter rod 40. This lifter rod is provided with a spur or lifter prong 41 which is adapted to engage with a lifter arm 42, the latter being secured on a rocker shaft 43, which is mounted in a bearing 44 on the frame 5. A rocker-actuating arm 45 is also secured on the rocker shaft 43, and is pivotally connected to the arm 25, through the medium of the link 46. A spring 47 is provided for holding the spur 41 normally in engagement with the lifter arm 42, a link 48 pivotally connecting the spring 47 and the lifter rod 40.

From the foregoing, it will be seen that when the roller 26 is raised by one of the lugs 15', the shaft 43 is partially rotated, through the medium of the members 24, 25, 46 and 45, the arm 42 being actuated by the shaft 43, so as to raise the lifter rod 40 and cause the hoe to move downward until the blade 27 has entered the soil. The forward movement of the corn planter, while the hoe blade is in the soil, causes the adjacent soil or earth to be dragged by the hoe, so as to leave a short furrow or pit which is clearly distinguishable from the adjacent comparatively level earth. However, this dragging of the soil is of comparatively short duration, because, as soon as the lug 15' has released the roller 26, it returns to its normal position, as shown, so that the lifter rod and hoe are allowed to return to their normal positions, as shown. In order to cause the hoe to return to its normal position, I have provided a retractile spring 49, having one end secured to the hoe beam 28, its other end being secured to a bracket 50, on the frame 5. In order that the hoe beam may withstand the pressure of the earth thereagainst, I have secured an end of a draft wire 51 thereto, and the other end of the draft wire may be secured to the tongue 52 or to any suitable part of the corn planter.

In practice, the rocker shaft 43 carries two arms 44 and two arms 42, although only one of each of said arms is illustrated; and, in connection with these arms 42 and 44, I employ a duplicate set of members which constitute my hill marker mechanism; so that, when the direction of travel of the planter is reversed, and another set of hoe marks or hill indications are to be made, one of the hill marker attachments is thrown out of operative relation while the other is thrown into operative relation. In order to throw the hill marker mechanism out of operative relation, I provide a hand lever 53 pivotally secured on the frame at 54 and pivotally connected at 55 to a link 56 which is slotted at 57. A stud 58 is secured to the lifter rod 40 and extends through the slot 57, so that the operative movement of the rod 40 is not retarded or affected by its engagement with the link 56. However, when it is desired to release the engagement of the arm 42 and the spur 41, the lever 53 is pulled rearward, so that the link 56 is pushed forward, thereby pushing the spur 41 forward and out of engagement with the arm 42, so that the arm 42 may have free movement independently of the lifter rod 40. The hoe beam 38 may then be raised into approximately vertical position, by first releasing the engagement of the link 34 and stud 37, then raising the outer end of the link 61 around the pivotal point 32, so that the arm 38, lifter rod 40 and the end of the link 48, which is secured to the latter, are lowered, while raising the outer end of the hoe. When in raised position, the hook 59 may be placed in engagement with a lug or eye 60, for retaining the hoe out of operative relation.

By means of this improved hill marker, I can accurately indicate the position of one row of hills while dropping corn in a previously marked row of hills; and, if, while dropping corn in a previously marked row, the corn-dropping interval becomes improperly timed, so that the corn is not being dropped at or opposite to the previously made hoe marks, the machine is stopped, the clutch is thrown out of gear, the lug 15 is moved by hand or by other proper means until the proper adjustment is made for properly dropping the corn at the hoe marks, and the clutch is then thrown in gear and the planter is again started.

It will be seen that I have provided an attachment of this character which is fully capable of attaining the foregoing objects, and in a thoroughly practical and efficient manner.

I do not limit my invention to the exact details of construction, combination and arrangement of parts as illustrated and described herewith, but my invention may only be limited by a reasonable interpretation of the claims.

What I claim is:

1. In a corn planter, a corn dropping mechanism, an arm adjacent to the corn dropping mechanism, a hoe pivoted to the arm, a rocker shaft, means operatively connecting the corn dropping mechanism with the rocker shaft for actuating the latter, a lifter arm carried by the rocker shaft, a lifter rod pivotally connected to the hoe and being normally in engagement with the lifter arm and coöperating therewith for actuating the hoe, and means for causing disengagement of the lifter rod and the lifter arm, whereby the corn dropper may operate without actuating the hoe.

2. In a corn planter, a frame, corn dropping mechanism supported by the frame, a substantially horizontal and stationary supporting arm pivotally connected to the frame and adapted to be raised into substantially vertical position, a hoe pivotally connected to the arm and adapted to be oscillated on a vertical plane, and means coöperatively connecting the corn dropping mechanism with the hoe for actuating the latter, means for interrupting the coöperative relation between the hoe and the corn dropping mechanism, and means for retaining the hoe in substantially vertical position when the supporting arm is raised.

3. In a corn planter, a corn dropping mechanism, a frame supporting the corn dropping mechanism, a hoe pivotally connected to the frame, a lifter rod pivotally connected to the hoe for raising one end of the hoe and lowering the other end thereof, said lifter rod having a spur thereon, a lifter arm normally in engagement with the spur, means coöperatively connecting the corn dropping mechanism with the lifter arm for actuating the latter and raising the lifter rod, and means independent of the lifter arm for lowering the lifter rod.

In testimony whereof I have signed my name to this specification in the presence of two subscribing witnesses.

FRANKLIN FERRELL.

Witnesses:
   JACOB FERRELL,
   WILLIAM HULME.